Sept. 2, 1941.    E. G. BUSSE    2,254,514
RAILWAY TRUCK BRAKE GEAR
Filed Dec. 26, 1940    2 Sheets-Sheet 1
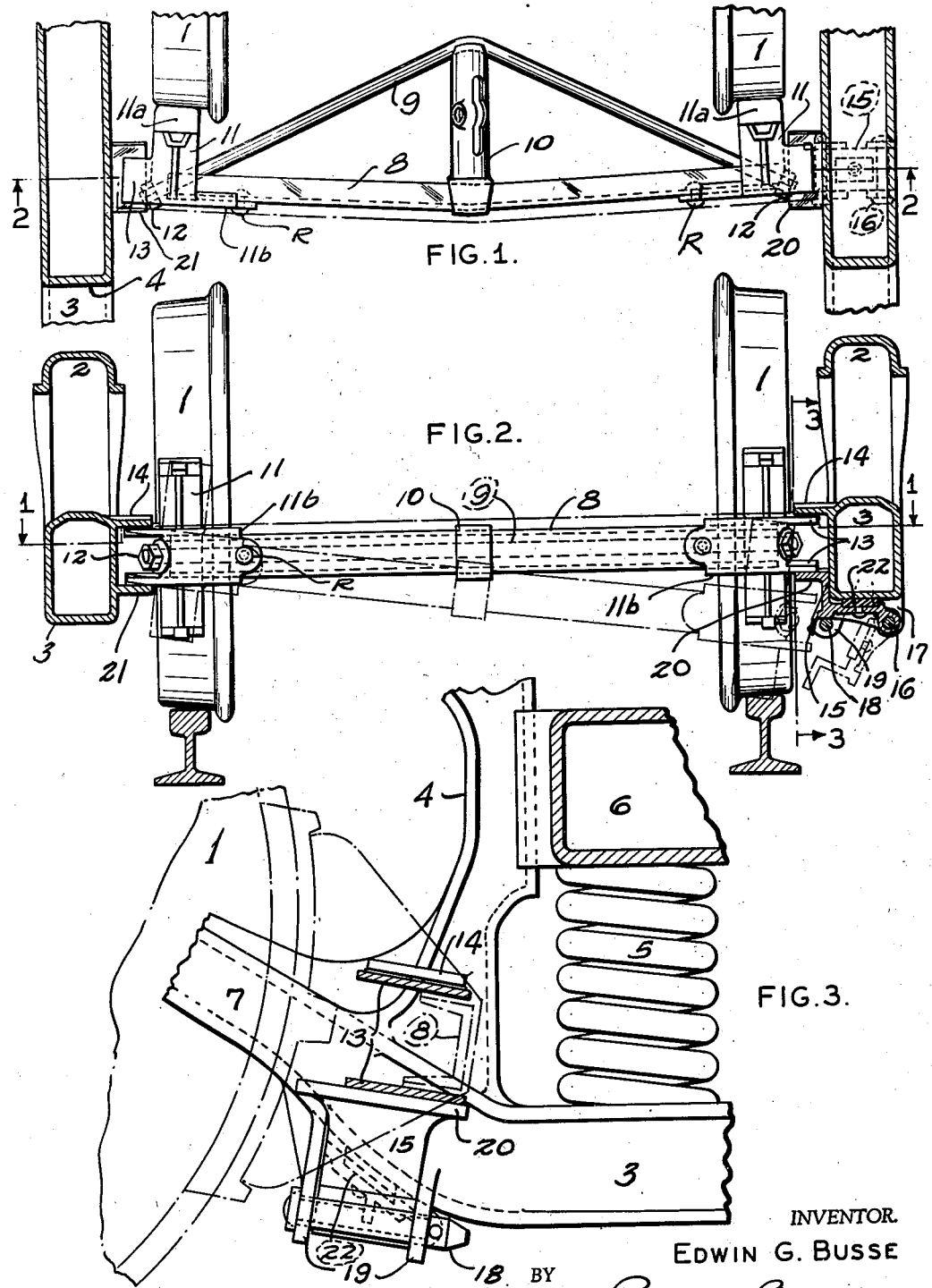
INVENTOR.
EDWIN G. BUSSE
BY
ATTORNEY.

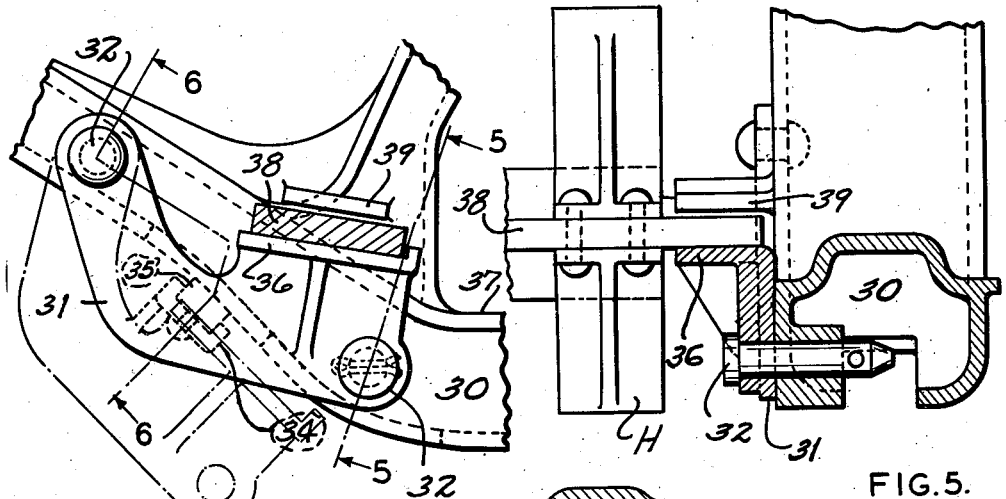
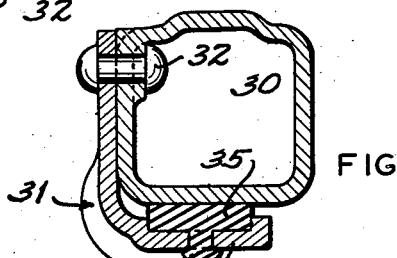
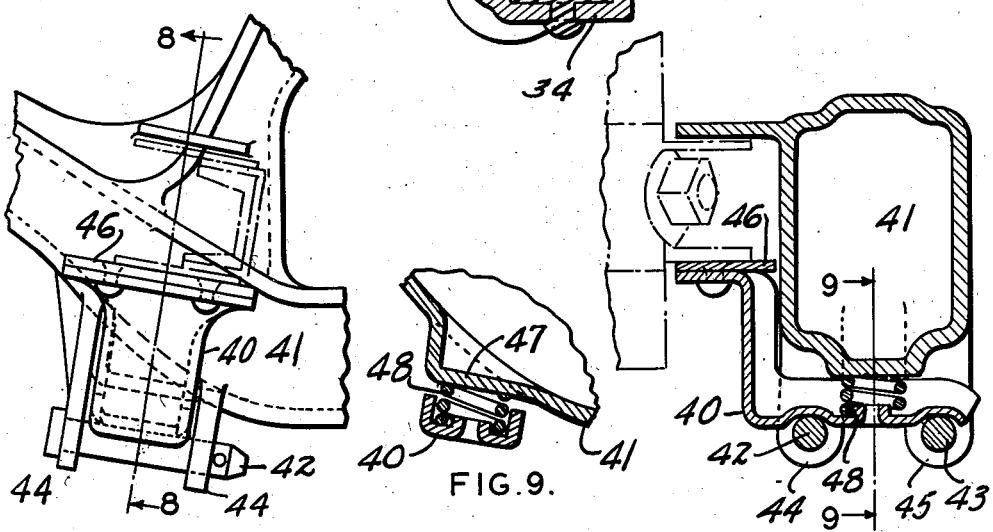
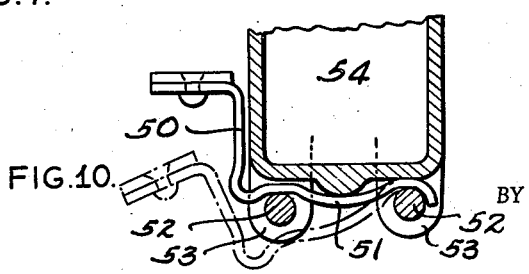

Patented Sept. 2, 1941

2,254,514

UNITED STATES PATENT OFFICE 2,254,514

RAILWAY TRUCK BRAKE GEAR

Edwin G. Busse, Chicago, Ill., assignor to Chicago Railway Equipment Company, Chicago, Ill., a corporation of Illinois Application December 26, 1940, Serial No. 371,655

14 Claims. (Cl. 188—212)

The invention relates to the supporting of a railway truck brake beam upon the side frame of the truck and, preferably, to the guiding of the beam in its movement to and from the truck wheels during application and removal of the brakes.

It has long been the practice to pivotally support the brake beam by swing hangers suspended from the truck side frames and to use supplementary guides to maintain the desired angular relation between the brake shoes and the brake wheels during the application and removal of the brakes, such guides usually serving also as safety devices for preventing the brake beam from falling to the road bed in the event of breakage of swing hangers.

In Patent No. 2,197,785 issued April 23, 1940, to the present applicant and in copending applications filed January 6, 1938, Serial No. 183,602 (Patent 2,226,551, issued December 31, 1940), and March 20, 1940, Serial No. 325,034, there is a departure from the above-mentioned practice in that the ends of the brake beam are slidable on brackets provided on the inner sides of the truck side frames and in the last-mentioned application the side frame bracket is movable into and out of functioning position to facilitate application and removal of the brake beam. The present invention relates to the latter-mentioned type of support.

One object of the present invention is to facilitate the manipulation of the beam supporting bracket so that one workman may readily apply and remove a brake beam.

Another object is to simplify the side frame construction and to avoid any difficulties which might arise from substantial changes in the side frame construction or from the necessity of substantially machining the side frame.

Another object is to safeguard the dropping of the beam to the read bed in the event of breakage or removal of the tension rod nut.

Another object is to avoid play between the beam supporting bracket and the frame upon which it is mounted.

These and other detailed objects as will appear below are attained by the structures illustrated in the accompanying drawings in which—

Figure 1 is a top view of a truss type brake beam showing the same applied to the wheels of a truck and showing in horizontal section the truck side frames provided with supporting brackets for the beam, as indicated by the section line 1—1 in Figure 2.

Figure 2 is a rear view of the brake beam showing the same applied to the wheels and also includes a vertical transverse section through the truck side frames, as indicated by the section line 2—2 in Figure 1, the beam and one of its supporting brackets being shown in broken lines in positions assumed during the application and removal of the beam.

Figure 3 is a side elevation, on an enlarged scale, of the inside face of a portion of the truck side frame showing the beam-carrying bracket and the adjacent beam, wheel, bolster and bolster spring elements, bracket engaging elements on the beam being sectioned, all as indicated by the section line 3—3 of Figure 2.

Figure 4 is a view similar to Figure 3 but illustrating another form of the invention.

Figures 5 and 6 are transverse sections taken on the corresponding section lines of Figure 4.

Figure 7 corresponds to Figure 4 but illustrates another form of the invention.

Figure 8 is a transverse section taken on the line 8—8 of Figure 7.

Figure 9 is a detail section extending longitudinally of the truck side frame and taken on the line 9—9 of Figure 8.

Figure 10 corresponds to Figure 8 but illustrates another form of the invention.

In Figures 1, 2 and 3 the truck wheels are indicated at 1 and it will be understood that these wheels are mounted upon the usual axles with journal boxes (not shown) which carry the truck side frames of familiar type, each including a top chord 2, a bottom chord 3 and spaced upright struts 4, the bottom chord between struts 4 forming a seat for springs 5 which support the truck bolster 6. The end portions of bottom chord 3 are inclined upwardly towards the adjacent wheels as indicated at 7.

A brake beam extends transversely of the truck between the side frames and preferably is of the truss type including a compression member 8, a tension member 9, a strut 10, brake heads 11 each equipped with a shoe 11a and seated on the ends of compression member 8, the parts being held in assembled position by the tension nuts 12 threaded on the ends of tension member 9. Preferably each brake head has its rear wall extended as at 11b and recessed to fit around the back, top and bottom of the compression member and secured to the same by a transverse rivet R, this arrangement acting as a safety device to prevent dropping of the beam to the rail in event of breakage of tension rod 9 or loss of one of the tensioning nuts 12.

Each brake head is provided with flanges 13 which project outwardly from the head towards the adjacent side frame alongside of the corresponding nut 12 to cooperate with elements provided on the truck side frame which support and guide the beam in its movement to and from the wheels during the application and release of braking forces.

The upper guiding element on each side frame preferably consists of a web 14 formed integral with the cast side frame and inclined to the vertical longitudinally of the truck similarly to the inclination of flanges 13 on the brake head. Obviously, element 14 may be detachably secured to the frame.

At the right hand side of the truck the lower supporting and guiding element on the side frame comprises a bracket 15 pivoted by a bolt or rivet 16 to lugs 17 depending from the outer side of the frame and normally held in raised functioning position by a readily detachable pin 18 seated in lugs 19 depending from the inner side of the side frame. The swinging portion of bracket 15 extends upwardly and inwardly of the frame to underlie the lower flange 13 on the brake head, and the upper inner ledge 20 of the bracket is inclined to the vertical longitudinally of the truck similarly to the inclination of flanges 13 and the associated web 14.

When pin 18 is removed, the bracket may swing downwardly below the bottom of the side frame, as indicated in broken lines in Figure 2, to clear the adjacent end of the brake beam and permit the same to be dropped below the side frame and moved transversely of the truck away from the supporting structure on the truck frame at the opposite side of the truck which preferably consists of an integral web 21 corresponding to the upper web 14 but spaced below the same. If desired, both side frames may be equipped with the swinging bracket. A pad 22 of rubber or like material may be secured to bracket 15 and compressed between the same and the bottom of the side frame when the bracket is raised and secured in functioning position.

Bracket 15 is mounted upon the inclined portion of the lower chord of the side frame, and the brake beam engaging ledge 20 extends above the level of the spring seating surface of the bottom chord, and the major portion of the bracket is above the bottom of the side frame and therefore substantially free of likelihood of injury from rocks, dirt or other material on the road bed.

In the arrangement shown in Figures 4, 5 and 6 the truck parts, including the side frame lower member 30, correspond to those illustrated in Figures 1-3 but the beam supporting and guiding bracket 31 is pivoted by a rivet 32 to the side wall of the inclined portion of member 30 and swings longitudinally of the frame. The bracket is held in its normal elevated functioning position by a retaining pin 32 but is releasable by removal of pin 32 so as to swing to the broken line position indicated in Figure 4 in which it will clear the end of the brake beam indicated at B and permit the application and removal of the latter to and from the frame.

Bracket 31 overlies the side wall of member 30 and has a horizontal lug 34 underlying the bottom wall of the member and provided with a pad 35 of rubber-like material which may be compressed when the bracket is in functioning position to eliminate wear and unnecessary play between the bracket and frame.

The end portion of a solid truss type beam is shown in Figures 4 and 5, and the same includes a horizontal flange 38 to which the brake head H is riveted, the flange extending outwardly beyond the head towards the side frame and being supported by the ledge 36 of bracket 31 and guided by the opposing web 39 on the frame. In this arrangement the bracket normally is wholly above the bottom of member 30, and its beam-engaging ledge 36 is substantially above the level of the surface 37 for seating the bolster spring (not shown).

Figures 7, 8 and 9 illustrate another arrangement in which the bracket 40 swings transversely of the lower chord 41 of the frame and is secured to the latter by a plurality of pins 42 and 43 seated in lugs 44 and 45, respectively, depending from the inner and outer sides of the frame chord. Bracket 40 is shown as a channel-shaped pressing of somewhat lighter section than the cast brackets described above, and the beam-engaging ledge 46 is formed by a separate plate secured to the upper inner end of bracket 40 and preferably formed of hardened metal to better resist wear. The side frame lower member is provided with a projecting shoulder 47 to form a better abutment for the spring 48 corresponding to elements 35 and 22 described above.

Figure 10 illustrates another form of the invention in which the bracket 50 preferably consists of resilient material which is deformed at 51 when the retaining pins 52 are both seated in their mounting lugs 53 on the truck frame bottom member 54, and this distortion of bracket 50 holds the same against play in the frame and eliminates the provision of a yielding pad or spring as previously described.

In each form of the invention there is provided a simple, effective bracket pivoted to the bottom of the underframe and movable from a position below the frame to a position in which at least a part of the bracket is located at the inner face of the side frame and extends under the end of the brake beam and preferably under flanges projecting outwardly from the brake beam heads. The mounting and retaining elements of the bracket are readily accessible to a workman at the outer side of the truck. The bracket supports and guides the beam and eliminates the necessity for the usual swing hanger, and the riveting of the brake head flange to the compression member, as indicated in Figure 1, avoids the dropping of the beam to the road bed even if the tension rod should break.

The details of the construction may be varied in other ways than illustrated and described without departing from the spirit of the invention and the exclusive use of those modifications of the structures which may be covered by the appended claims is contemplated.

What is claimed is:

1. In a railway truck, wheels, a side frame, a brake beam including heads and shoes for application to said wheels, at least one end of said beam including an element projecting from the adjacent head towards said side frame, and a member for supporting and guiding said beam in its movement towards and from said wheels, said member being pivoted to the lower portion of said side frame and movable about its pivot into a functioning position where it underlies said brake beam projecting element or into a lowered position below said side frame in which it clears said projecting element to accommodate the application and removal of the beam to and from the truck, there being readily detachable means accessible from the exterior of said side frame for holding said member in functioning position.

2. A structure as described in claim 1 which also includes a yielding member compressed between the truck frame and the support member when the latter is in functioning position and thereby preventing rattling and wearing of said frame and member.

3. A structure as described in claim 1 in which the truck side frame is provided with a rigid bracket above and substantially paralleling the beam support member, when the latter is in its functioning position, to oppose an upwardly facing portion of the brake beam and to cooperate with said member in guiding the beam in its movement to and from the wheels.

4. In a railway truck, wheels, a side frame, a truss type brake beam including a compression member, brake heads seated on the ends thereof, a tension member with its ends extending through said heads, there being tensioning nuts threaded on the ends of said tension member and seated against the outer faces of said heads and there being a flange on at least one of said heads extending alongside of and past said nut towards said side frame, and a member having a part underlying said side frame and pivoted thereto and having a part normally extending upwardly between said side frame and the adjacent brake head and underlying said flange for supporting and guiding said beam in its movement to and from said wheels, said member being movable about its pivot into a lowered position below said side frame in which it clears said brake beam and flange to accommodate the application and removal of the beam to and from the truck, there being readily detachable means for holding said member in functioning position.

5. In a railway truck, wheels, a side frame having a lower chord forming a bolster spring seat portion and inclined upwardly from said portion towards the adjacent wheel, a brake beam with one of its ends terminating adjacent to said side frame, and a member for supporting and guiding said beam in its movement towards and from said wheels, said member being pivoted to the inclined portion of said lower chord and movable to a raised position in which its swinging part extends above the level of said spring seat and underlies the end of the brake beam and to a lowered position in which its swinging part drops clear of the end of the brake beam to accommodate the application and removal of the beam to and from the truck.

6. In a railway truck, wheels, a side frame having a lower chord forming a bolster spring seat portion and inclined upwardly from said portion towards the adjacent wheel, a brake beam with one of its ends terminating adjacent to said side frame, and a member for supporting and guiding said beam in its movement towards and from said wheels, said member being pivoted to the inclined portion of said lower chord and normally being wholly above the level of the bottom of said frame and movable to a position in which its swinging part underlies the end of said brake beam to support and guide the latter and to a position in which said swinging part drops clear of the end of said brake beam to accommodate the application and removal of the latter to and from the truck.

7. In a railway truck, wheels, a side frame having lugs depending from its inner and outer sides, a brake beam including elements for application to the wheels, and a member for supporting and guiding said beam in its movement towards and from said wheels, said member being in substantial alignment with the longitudinal axis of said beam and being pivoted to the outer of said lugs to swing transversely of said frame, about a pivot extending longitudinally of the frame, to a raised functioning position in which it extends a relatively short distance inwardly from said frame to underlie a portion of said brake beam projecting outwardly beyond the adjacent wheel engaging elements and support and guide the latter in its movement towards and from the wheels, and to a lowered position in which it clears the brake beam and the track rail and accommodates the application and removal of the beam to and from the truck, there being means detachably secured to the inner of said lugs to hold said member in functioning position.

8. A structure as described in claim 7 which also includes a yielding device compressed between the bottom of the truck frame and the beam supporting member when the latter is in functioning position to avoid play between the frame and member.

9. In a railway truck, wheels, a side frame, a brake beam including heads and shoes for application to said wheels, and a member for supporting and guiding said beam in its movement towards and from said wheels, said member being pivoted to the lower portion of said side frame to swing longitudinally of said frame about a pivot extending transversely of the frame to a raised functioning position in which it underlies the adjacent end of said brake beam and to a lowered position in which it clears said beam end and accommodates the application and removal of the beam to and from the truck, there being readily detachable means for holding said member in functioning position.

10. A structure as described in claim 9 in which the beam supporting and guiding member swings alongside an upright face of the truck side frame and is provided with a lug engaging the bottom of the truck side frame to assist in positioning the member, there being a yielding member compressed between said lug and the bottom of said side frame when the member is in functioning position.

11. A structure as described in claim 9 in which the truck side frame includes a rigid bracket above and substantially parallelling the beam supporting and guiding member, when the latter is in its functioning position, to oppose an upwardly facing portion of the brake beam and to cooperate with said member in guiding the beam in its movement to and from the wheels.

12. A structure as described in claim 1 in which a portion of the beam supporting and guiding member is resilient and is distorted by contact with the side frame when in functioning position to avoid play between the member and frame.

13. In a railway truck, wheels, a side frame provided with an inwardly extending bracket, a truss type brake beam including compression and tension members extending from side to side of the truck and a head mounted on said members and having a part overlying and supported by said side frame bracket, means on the end of one of said members engaging the outer face of said head to secure the same against removal there-from, said head also including a part extending towards the center of the beam and alongside the other of said members and secured thereto at a point spaced inwardly of the beam from said means.

14. In a railway truck, wheels, a side frame provided with an inwardly extending bracket, a truss type brake beam including a compression member, a strut, a brake head seated on the end of said compression member, a tension member extending through said brake head, a tensioning nut threaded on the end of said tension member and seated on the outer side of said head to hold the parts of said beam assembled, there being a flange projecting from the outer face of said head overlying said side frame bracket to support the beam and there being an extension projecting from the inner face of said head and riveted to said compression member to maintain assembly and support of the beam in event of the loss of said nut or the breakage of said tension member.

EDWIN G. BUSSE.